DONALD W. REES
ROBERT C. HILLIARD
JAN HOOGLAND
INVENTORS

United States Patent Office 3,539,721
Patented Nov. 10, 1970

3,539,721
WIDE ANGLE TELEVISION PROJECTION DEVICE
Donald W. Rees, Warren, Mich., Robert C. Hilliard, Hampton Falls, N.H., and Jan Hoogland, Wilton, Conn., assignors, by direct and mesne assignments, to the United States of America as represented by the Secretary of the Army
Filed Oct. 20, 1967, Ser. No. 677,510
Int. Cl. H01j 29/89
U.S. Cl. 178—7.89       5 Claims

ABSTRACT OF THE DISCLOSURE

A television tube of the projection type including a vacuum housing within which are located an electron gun, a phosphor coated target and an optical system. Between the phosphor coated target and the electron gun, there is positioned a concave spherical mirror formed to define an aperture through which electrons travel in their passage from the electron gun to the phosphor coated target. The concave spherical mirror is reoriented to reflect the image formed by fluorescence of the phosphor target to and through a pair of lenses located directly behind the phosphor coated target. The pair of lenses comprises a convexo-concave and a concavo-convex lens which, in combination, refract the light rays received from the concave spherical mirror and produce a wide angle television projection. In a preferred embodiment, the phosphor coated target consists of a phosphor coated, hollow, spherical member supported upon an adjustable supporting means operable from outside of the vacuum housing, and providing improved heat dissipation and X-ray absorption to protect the apparatus during high power density level operation.

---

Figure 1:
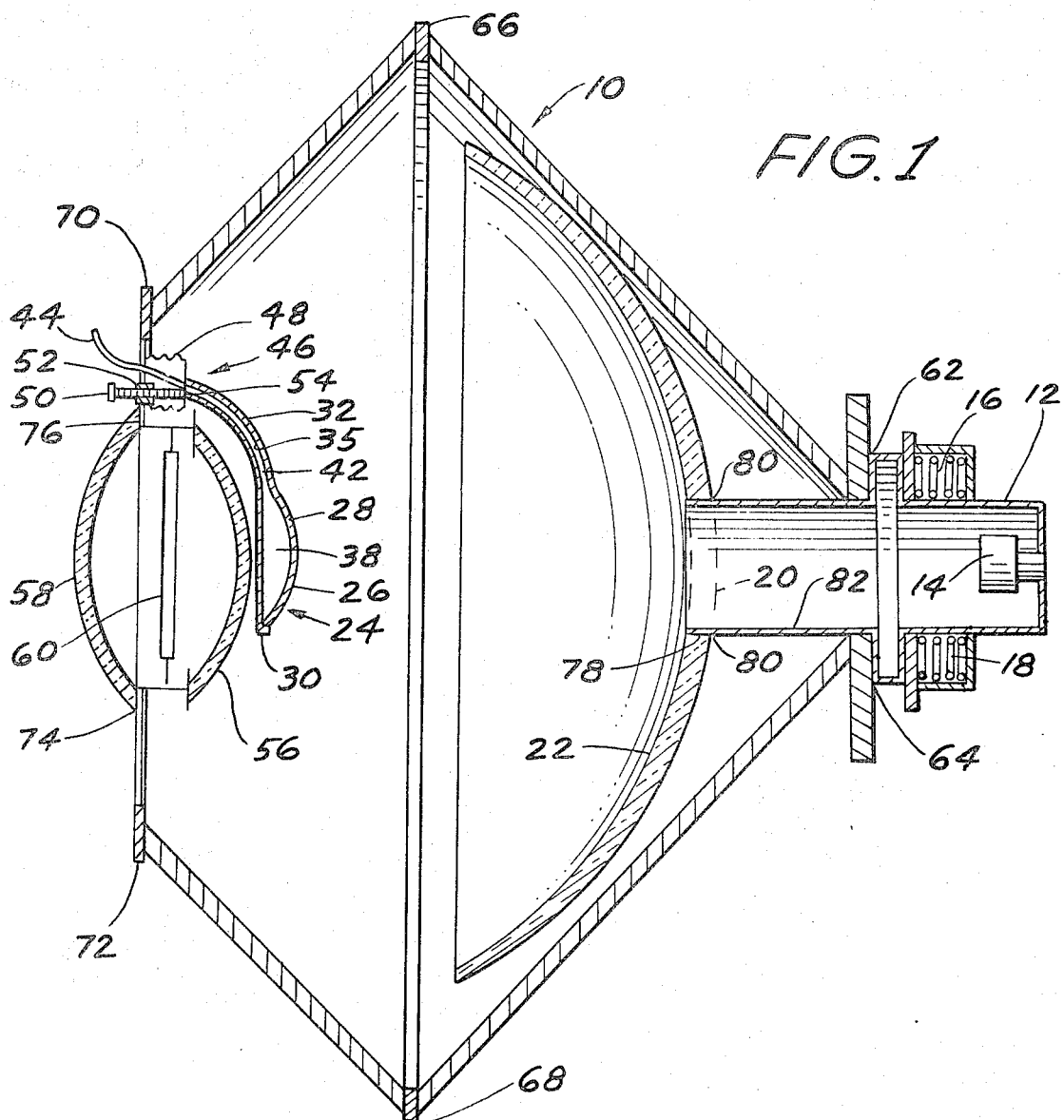
Figure 2:
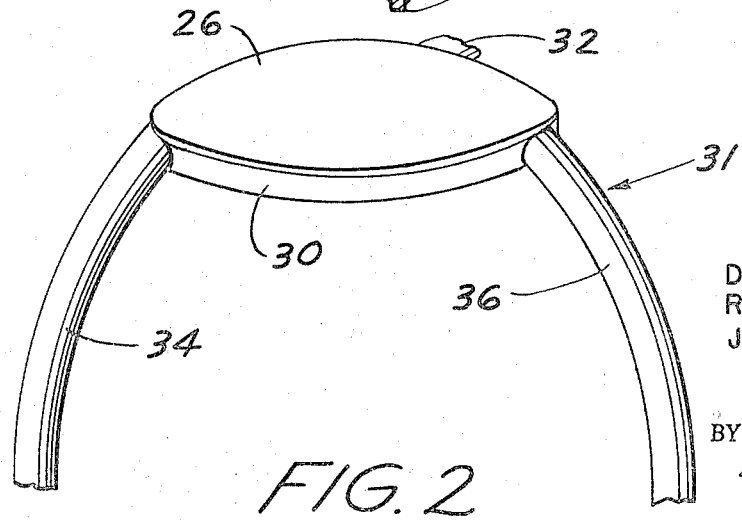

The invention described herein may be manufactured and used by or for the Government for Governmental purposes without the payment to us of any royalty thereon or therefor.

The present invention relates to a television projection device suitable for the projection of wide angle television images. More particularly, the invention relates to television image reproduction tubes of the projection type, wherein the elements of the optical system are incorporated in the tube envelope, focus of tube may be accomplished from without the vacuum housing of the projection, and protection is provided againt unwanted X-ray and harmful or destructive heat levels produced by high power density level operation.

Projection tubes of the prior art, although they have provided an integral vacum unit containing substantially all of the optical, electrical, and image producing components of the device, were generally of a prefocused type. That is, the optical units was focused and locked in focus prior to installation within the tube housing or envelope. Hence, once installed, the optical unit did not and could not have variable applicability.

Such tubes possessed only abbreviated useful lives when operated at high power density levels, due to the generation at such levels of harmful and destructive temperature conditions in the phosphor. Since the efficiency of the phosphor decreases with increases in temperature, even moderately high temperatures caused by moderate power density level operation result in substantial decreases in overall tube efficiency.

Still another problem encountered in such prior art tubes was the emission of unwanted X-ray radiation which could not be absorbed without substantial interference with the optical light paths of the projection device.

It is therefore an object of the present invention to provide a wide angle television projection tube having a large numerical aperture in order to project a magnified image of an electronically activated fluorescent screen at a minimal distance with a minimum loss of light and with an optical resolution consistent with television requirements.

Another object of the present invention is the provision of an electron gun and scanning component orientation which places these items out of the paths of the light rays and causes no degradation of the resolution of the electron spot.

Still another object of the present invention is to provide an improved, self-contained electronic optical television projector in which the optical elements are included in or are part of the vacuum housing containing the electron gun and phosphor screen which projector has an adjustable focus during its entire useful life.

Yet another object of the invention is the provision of a means whereby the phosphor screen of the projection device may be operated at high power density levels without the simultaneous generation of harmful and destructive temperature conditions in the phosphor.

A further object of this invention is the provision of a television projection device in which the absorption of unwanted X-ray radiation, produced as a result of the incidence of the electrons striking the phosphor, can be accomplished without substantial interference with the optical light paths of the device.

Other objects and advantages of the present invention will be made obvious to those skilled in the art by the following description when considered in relation to the accompanying drawings of which:

FIG. I is a longitudinal diametrical section through a projection-type television tube constructed in accordance with a preferred embodiment of the invention; and FIG. II is a plan view of the phosphor coated target of FIG. I mounted upon its tripod spider.

Referring to the drawing, FIG. I shows a longitudinal diametrical section through a projection-type television tube constructed in accordance with a preferred embodiment of the present invention. The vacuum housing 10 has an elongated neck portion 12 extending from one end thereof. Located within this elongated neck portion is an electron gun 14, which lies within the confines of the vacuum environment. On the outer surface of the elongated neck portion are deflecting coils 16 and 18. When the electron gun is discharged the electrons are aimed by means of the deflection coils and pass through an aperture 20, in concave spherical mirror 22, which is secured to the vacuum housing 10, as described below. The aperture 20, is hereinafter designated as the concave spherical mirror aperture. The electrons then proceed to strike a plano-convex target 24, having a phosphor coating 26 upon its convex surface 28. This phosphor coating may be of any conventional type such as the P-4 types commonly utilized in projection apparati of this type. The phosphor utilized is determined solely by the brightness requirements for standard black and white or, perhaps in more advanced applications and devices, color projections.

The plano-convex target 24, having the phosphor coating 26, upon its convex surface 28, may be constructed from any of a number of basic materials including titanium, stainless steel, or Kanogen coate aluminum. In the preferred embodiment depicted in FIG. I, the target is hollow, a characteristic whose value for cooling the target will be explained below.

In the preferred embodiment shown in FIG. I, the planoconvex target is mounted in a cup-shaped container 30, of any suitable X-ray absorbing material such as lead. The cup-shaped container serves the dual purpose of providing a mounting for the target while at the same time acting as an absorber for X-rays which may be generated by electron excitation of the phosphor target.

The cup-shaped container is in turn mounted by any suitable mechanical means such as solder, weld or epoxy adhesive upon a tripod structure 31 shown in detail in FIG. II. The tripod structure 31, commonly referred to as the spider, has leg members 32, 34, and 36. In the preferred embodiment shown in FIG. I, only one of the leg members, 32, is visible. It should be noted that the leg member, just as the target, is preferably hollow. Thus, in addition to providing support for the target set in its cup-shaped lead container, the leg members also provide a means for dissipating heat which may be generated when the tube is operated at moderate to high power density levels. By pumping air or some other heavier liquid coolant into the hollow leg 32, through the hollow target 24, and out one or both of legs 34 and 36, the target may be cooled and retained at a safe and nondestructive temperature level during the entire period of tube operation even at elevated power density levels. When only one of the three legs is utilized for purposes of coolant drainage, the third leg may be suitably stoppered with some coolant resistant cork or plug. The coolant utilized may be any suitable liquid which can be pumped through the system cooling as it passes.

In the above embodiment, the target cavity 38 is joined to the leg cavity 35 of leg 32 by means of a conduit 42 which transports the coolant liquid from leg cavity 40 in leg 32 through the cup shaped container 30 and into the target cavity 38. The target cavity is in turn similarly connected to the leg cavities of legs 34 and 36 (not shown), so that coolant may be drawn out of the the target cavity.

An alternative for the connection between coolant inlet tube 44 and hollow leg member 32 will be explained in detail below. A simple method of such connection would be direct connection of the tube to the base of the hollow leg members as shown in FIG. I.

Adjustment of the phosphor coated target is provided by a screw adjustment shown at 46 of FIG. I. Such a screw adjustment is located at the base of each of the spider leg members and permits adjustment of target focus after the tube is sealed. Each such screw adjustment apparatus is sealed from the vacuum environment within the vacuum housing by means of sylphon bellows 48. A properly sealed bellows can serve as conduit for the coolant which is to be pumped from coolant inlet tube 44 to the hollow leg member 32, if direct connection is not practical. The screw adjustment apparatus itself consists of a thumb screw 50 which is rotatably journaled in a sleeve-like member 52, which forms part of the vacuum housing 10. The action of sleeve-like member 52, and screw 50 is analogous to the action of a nut and bolt combination, with the nut being held stationary. The thumb-screw is in turn connected directly to the base of the spider leg member at 54 by any suitable mechanical means. Thus, when screw 50 is turned, spider leg 32 can be made to move up and down providing a means of focusing the device by changing the position of the target before the optical system.

The electron beam causes the phosphor to fluoresce and produce an image which is reflected from concave spherical mirror 22, to and through convexo-concave lens 56, which refracts the reflected image and transmits it to concavo-convex lens 58, which again refracts the image light rays and transmits a wide angle version of the image which was narrowed by lens 56. The combination of lenses 56 and 58 replaces the Schmidt corrector normally utilized in prior art projection tubes as a means of rectifying the image reflected from the concave spherical mirror 22. The image projected by the tubes of this invention is elliptical and not planar as that produced by the Schmidt corrector, nor spherical as would be produced without correction.

The effective focal length of the total lens combination may be as short as 5.5118 inches, hence a wide angle projection can be projected at a very short distance. The lens combination has a focal number of 0.87, thus providing an extremely fast lens which utilizes and projects a maximal amount of the light and brightness produced by phosphor fluorescence.

Lying between the lenses 56 and 58 is a fixed stop aperture 60, which prevents fall off of brightness at the edge of the image and reduces aberration which may occur at the same point.

The lens 58 actually forms the closure of the vacuum housing 10 at its location thereon.

Thus, the vacuum housing 10 encloses the electron gun, the phosphor coated target and all of the optical elements with the exception of lens 58. The deflection coils 16 and 18 are mounted externally principally for convenience and simplicity.

With regard to the vacuum housing 10 itself, it is symmetrical about a center line extending from the geometrical center of lens 58 to the geometrical center of elongated neck portion 12. The vacuum housing and elongated neck portion, shown in FIG. I as constructed of a metal, may be constructed of any suitable metal or other material and are joined by conventional solder or welding techniques about the circumferential housing joints which pass through points 62 and 64, 66 and 68, and 70 and 72.

According to a preferred embodiment, attachment of lens 58 to the vacuum housing 10 is accomplished by Kanogen coating the contacting surfaces of the lens and soldering these surfaces with indium solder at the circumferential contact joint passing through points 74 and 76.

The concave spherical mirror 22 which may be made of Kanogen coated aluminum vacuum aluminized glass, or any other suitable reflective material or combination of materials, is attached to vacuum housing 10 by direct attachment of the circumferential inner edge 78 of the concave spherical mirror aperture 20, to the circumferential outer surface 80 of the elongated portion 82 of extended neck portion 12. Connection and sealing may be accomplished utilizing any conventional means such as welding or soldering. Attachment of the mirror to the vacuum housing is made at the center of the mirror so that any distortion in the shape of the vacuum housing or the mirror caused by elevated temperatures may be kept to a minimum without the danger of transmittal of such distortion to other parts of the concave spherical mirror.

As a further modification of the projection tube of the invention, an ion pump may be added in combination with the above described system, in order to insure maximum vacuum housing evacuation during all periods of operation.

Since it is obvious that many changes and modifications can be made in the above described details without departing from the nature and spirit of the invention, it is to be understood that the invention is not limited to said details except as set forth in the appended claims.

What is claimed is:

1. A television tube of the projection type including in combination: a vacuum housing containing an electron gun located in an elongated neck portion of said vacuum housing; a phosphor coated target; means for supporting said phosphor coated target; means for adjusting said supporting means; optical elements comprising a concave spherical mirror oriented to receive image transmissions from said phosphor coated target and having an aperture at the center thereof through which said electron gun beams electrons; a pair of lenses, one of which is convex and other concave, mounted in said vacuum housing to receive image reflections from said concave spherical mirror and project a wide angle television projection, said phosphor coated target being located intermediate said pair of lenses and said aperture and said adjusting means comprising a thumb screw rotatably journaled in a sleeve-like member having internal threads formed therein and forming part of said vacuum housing; said thumb screw being directly and mechanically attached at a terminal end thereof to the base of said supporting means; and a bellows isolating said adjusting means from the vacuum environment of said vacuum housing.

2. A television tube in accordance with claim 1 wherein said phosphor coated target comprises a hollow, plano-convex structure providing a target cavity, a planar surface and a convex surface; said convex surface having a phosphor coating thereon.

3. A television tube in accordance with claim 2 wherein said phosphor coated target supporting means comprises a tripod having three hollow leg members; said three hollow leg members providing three leg cavities; and at least one of said leg members being attached to said terminal end of said thumb screw.

4. A television tube in accordance with claim 3 wherein said three leg cavities are each joined at one extreme to said target cavity by a conduit and at an opposing extreme to a second conduit which joins each of said leg cavities to the exterior of said vacuum housing.

5. A television tube in accordance with claim 4 wherein at least one of said second conduits is connected to a liquid supply source; and at least one of said second conduits is connected to a liquid drainage source.

References Cited

UNITED STATES PATENTS

| | | | |
|---|---|---|---|
| 2,342,778 | 2/1944 | Wolff | 178—7.85 X |
| 2,453,003 | 11/1948 | Edwards | 178—7.88 X |
| 2,520,190 | 8/1950 | Amdursky | 178—7.88 X |
| 2,960,615 | 11/1960 | Harries | 178—7.88 X |
| 3,209,073 | 9/1965 | Falbel | 178—7.85 X |

FOREIGN PATENTS 463,891   4/1937   Great Britain.

ROBERT L. GRIFFIN, Primary Examiner

R. K. ECKERT, JR., Assistant Examiner

U.S. Cl. X.R.

178—7.88